United States Patent [19]

Hay

[11] 3,884,709

[45] May 20, 1975

[54] POROUS MULLITE REFRACTORY

[75] Inventor: John Hay, Shrewsbury, Mass.

[73] Assignee: Norton Company, Worcester, Mass.

[22] Filed: Dec. 17, 1973

[21] Appl. No.: 425,204

[52] U.S. Cl.................. 106/65; 106/40 R; 106/73.4; 106/73.5
[51] Int. Cl............................................. C04b 35/10
[58] Field of Search............ 106/40 R, 65, 73.4, 73.5

[56] References Cited
UNITED STATES PATENTS

| | | | |
|---|---|---|---|
| 2,290,107 | 7/1942 | Luks | 106/65 |
| 2,898,216 | 8/1959 | Bray et al. | 106/65 |
| 2,982,664 | 5/1961 | Luks et al. | 106/65 |
| 3,291,619 | 12/1966 | Luks | 106/65 |

Primary Examiner—J. Poer
Attorney, Agent, or Firm—Rufus M. Franklin

[57] ABSTRACT

Porous refractory plates, tubes, or other shapes are produced by bonding fused coarse mullite particles with manganese oxide, by mixing the particles with a manganese salt, molding to shape, and firing at 1,425° to 1,475°C.

4 Claims, No Drawings

POROUS MULLITE REFRACTORY

FIELD OF THE INVENTION

This invention relates to porous refractory articles made from fused mullite grain ($3Al_2O_3 \cdot 2SiO_2$), and a method of producing them.

BACKGROUND OF THE INVENTION

When manufacturing porous ceramic materials by bonding ceramic grains together it is desireable to use a minimum amount of bond so that the voids between the granular portion of the structure are not blocked. In the case of some products, such as grinding wheels and ceramic porous media, vitrified ceramic bonds are used. The non-refractory nature of such bonds makes the products unsuitable for high temperature applications. Under the influence of heat, the bond softens and permits the product to deform and fracture. The present invention proposes to use a manganese salt as a source of manganese oxide to react with mullite grains to form a strong, low volume, refractory bond. Although manganese compound additions have been used in the production of ceramic products containing alumina and silica, such as U.S. Pat. No. 2,290,107, no teaching of the use of manganese salts mixed with mullite grains to produce a porous heat resistant product is known to applicant.

SUMMARY OF THE INVENTION

The refractory bodies of this invention are made from fused-crushed mullite grits, bonded by the addition of a small amount of a manganese compound which upon heating will form a liquid phase, and then be converted to manganese oxide. The formation of the liquid phase is essential in the present invention. Due to capillary forces, the manganese containing liquid is drawn into the positions where two or more grains of fused mullite are in contact. The bond formed by the decomposition of this liquid at higher temperatures into an oxide of manganese, and its reaction with the mullite is thereby concentrated where it is desired in the structure, effectively welding the grains together without any significant reduction in the pore volume of the body, while retaining good mechanical strength in the fired product at 1,200° to 1,450°C.

Although manganese chloride is employed in the example given herein, other fusible salts, such as manganese fluoride or manganese sulfate, may be employed. An optimum ratio of gram atoms of manganese to moles of mullite is 1 to 12. However ratios of as low 1 to 20 may be employed. Ratios higher than 1 to 5 are undesireable, creating an excessive amount of bond with no added benefit.

The mullite employed in the preferred embodiment of the invention is commercially available fused crushed granular, elongated grit. Chemically it is somewhat higher in alumina than the stoichiometric 3/2 mole ratio for pure mullite, $3Al_2O_3 \cdot 2SiO_2$, a typical analysis being: $SiO_2$ 24.4 percent, 75 percent $Al_2O_3$, and remainder impurities ($FeO$, $TiO_2$, $Na_2O$).

SPECIFIC EMBODIMENT OF INVENTION

Porous plates 12 inches × 12 inches × 1-¼ inches were produced from the following mix:

| | |
|---|---|
| Fused mullite 14/24 mesh (through 14 on 24, W. S. Tyler Co. sieves) | 4500 g. |
| $MnCl_2 \cdot 4H_2O$, 100 mesh | 180 g. |
| Dextrin | 90 g. |
| Water | 100 cc. |

The plates were produced by compacting the damp mix in a form by means of a light roller, so that only light pressure was employed and fracture of the elongated mullite grains was prevented. After being fired at 1,450°C for three hours, the pieces were well bonded. The amount of manganese in the fired product was 1.5 percent, calculated as $Mn_3O_4$. Air permeability measurements on the plates showed that at a back pressure of 2 inches of water, this plate passed 150 cubic feet per minute per square foot of plate area. Text bars of this material, measuring 9 inches by 2-½ inches by ¾ inch, when supported on knife edges at a six inch span, exhibited no sagging when heated at 1,250°C for 6 hours. Slight deformation occurred in 3 hours at 1450°C. Standard vitrified bonds cause collapse when the bonded products are heated at 1,200°C for 3 hours.

As used herein, the term "decomposing" to form manganese oxide, includes compounds which break down to form the oxides directly or which require reaction with a source of oxygen to form the oxides.

What is claimed is:

1. A method of making porous monolithic shapes of bonded mullite grits comprising forming a mix of mullite grits and a manganese compound having a melting point below 1,450°, and which decomposes to manganese oxide between its melting point and 1,450°, forming said mix to shape and firing to produce a bond including manganese oxide adjacent the contacting portions of the mullite grits.

2. A method as in claim 1 in which the manganese salt is manganese chloride.

3. A porous monolithic mullite body consisting of mullite grains bonded at their points of contact with a reaction product of manganese oxide and mullite.

4. A mullite body as in claim 3 containing from 0.2 to 0.05 gram atoms of manganese per mole of mullite.

* * * * *